United States Patent [19]

Reynolds

[11] 4,141,482
[45] Feb. 27, 1979

[54] LAMINATED COMPACTED PARTICLE ALUMINUM SHEET

[75] Inventor: William G. Reynolds, Richmond, Va.

[73] Assignee: Reynolds Metals Company, Richmond, Va.

[21] Appl. No.: 790,417

[22] Filed: Apr. 25, 1977

[51] Int. Cl.² .............................................. B23K 19/00
[52] U.S. Cl. .................................... 228/158; 228/190; 228/232; 228/235; 75/208 R
[58] Field of Search ............... 228/155, 235, 158, 175, 228/190, 202, 200, 232; 75/211, 213, 200, 208 R

[56] References Cited

U.S. PATENT DOCUMENTS

| | | | |
|---|---|---|---|
| 2,383,511 | 8/1945 | Reynolds | 228/235 X |
| 2,457,861 | 1/1949 | Brassert | 228/190 X |
| 2,786,266 | 3/1957 | Fayles | 228/252 X |
| 3,076,706 | 2/1963 | Daugherty | 75/211 |
| 3,199,176 | 8/1965 | Freudiger | 228/235 X |
| 3,246,982 | 4/1966 | Moritz | 75/213 |
| 3,269,004 | 8/1966 | Smith | 228/235 X |
| 3,300,838 | 1/1967 | Slater | 228/235 X |
| 3,837,068 | 9/1974 | Dunn | 75/208 R X |

Primary Examiner—James L. Jones, Jr.
Assistant Examiner—K. Ramsey
Attorney, Agent, or Firm—Glenn, Lyne, Girard, Clark and McDonald

[57] ABSTRACT

Compacted-particle sheets are wrought from essentially scrap aluminum. A relatively thick composite laminate of such sheets is then produced by preheating a plurality of compacted-particle sheets and bonding them together by hot rolling in a single pass through a hot rolling mill to achieve a thickness reduction of about 50 percent. A second pass through a rolling mill results in a further 20 percent reduction and improved bonding. Improved laminate qualities are also obtained by further laminating with other aluminum alloys and other metals.

2 Claims, 2 Drawing Figures

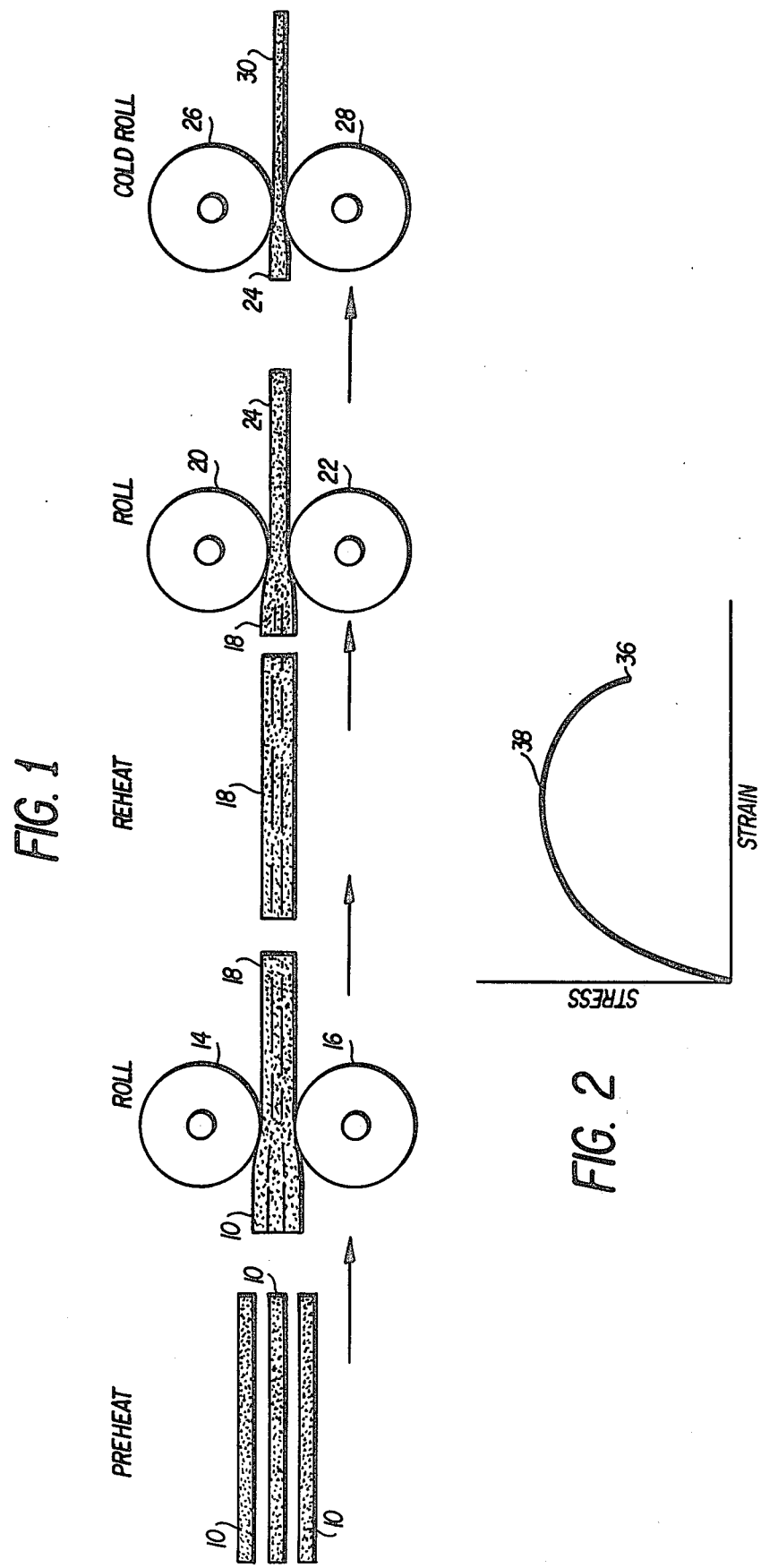

LAMINATED COMPACTED PARTICLE ALUMINUM SHEET

BACKGROUND OF THE INVENTION

This invention relates to compacted particle aluminum sheets of the type described in U.S. Pat. Nos. 3,076,706 and 3,246,982; and, more particularly, to the production of heavy guage compacted particle aluminum sheets and compacted particle aluminum sheets having improved properties.

In the past it has been difficult to make compacted particle aluminum sheets having a thickness of more than about 0.070 inch. The instant invention, however, permits the production of much thicker compacted particle aluminum sheets which permit their use in high-strength-requirement products such as aluminum sheet bumpers for automobiles. Moreover, an advantage of such sheets is that they have a desirable structure resulting from a fine dendritic cell size in rapidly solidified particles which is not obtainable from sheets produced from ingot material. Additionally, the instant invention can be used to provide compacted particle aluminum sheets having an improved transverse ductility.

The invention also relates to the production of relatively inexpensive aluminum sheets from recycled aluminum scrap. In this respect, one of the problems in using recycled aluminum has been the need to use expensive methods for reducing impurities in the recycled metal because conventionally produced aluminum alloys are usually unsatisfactory unless recycling impurities are substantially reduced. The instant invention, however, permits the use of recycled aluminum in a manner so that expensive impurity-removal steps need not be taken while the resulting product nevertheless has the qualities that are desired from higher purity alloys.

SUMMARY

Relatively thick composites of compact particle sheet are produced by preheating a plurality of such sheets and bonding three or more such sheets together by hot rolling them in a single pass through a hot rolling mill to achieve a thickness reduction of about 50%. The integrity of the bond between the layers is then improved by a second pass through the hot rolling mill to achieve a further reduction of about 20%.

One or more compact particle sheets can also be preheated and laminated in a similar manner with sheets of other aluminum alloy material having better finishing or corrosion-resistant properties. In this manner the invention provides low cost compacted particle sheets having advantages that are only otherwise attainable in expensive alloy sheets.

Alternatively, compact particle sheets are laminated with other metals to provide resulting sheets having qualities such as an increased elastic modulus or better platability than can be obtained from the compact particle sheet itself.

BRIEF DESCRIPTION OF THE DRAWING

The foregoing and other objects, features, and advantages of the invention will be apparent from the following more particular description of preferred embodiments of the invention as illustrated in the accompanying drawing. The drawings are schematic and are not intended to be to scale-- emphasis instead being placed on illustration of principles of the invention.

FIG. 1 is a schematic illustration of a method of the invention.

FIG. 2 is a typical graph of a type used in connection with toughness tests.

With reference to FIG. 1, three sheets of 0.070 inch compacted particle sheet 10 are tack-welded together as a convenience for holding them in place. They are then preheated to a suitable hot-rolling temperature and fed into a hot-rolling mill 12 between rollers 14 and 16 for bonding the three laminae together into a composite sheet 18 having an overall thickness reduction of about 50%. The composite laminate is then reheated to hot-rolling temperature and passed through additional hot rolls 20 and 22 to effect another overall thickness reduction of about 20% and enhance the integrity of the bond between the layers in sheet 24.

Thereafter, if desired, the laminate can be further passed through cold rollers 26 and 28 to form a work-hardened composite 30 of the desired guage.

Additionally, laminae of three, nine, and as many as 27 layers have been suitably bonded together by successive heating and hot rolling steps of laminae such as 18 or 24 in the manner described above.

Other numbers of compacted particle sheets 10 can also be placed together in the above manner to arrive at composites having different numbers of layers.

By producing the composite from compacted particle sheets the resulting composite has the desirable structure resulting from its having been formed from particles having a fine dendritic structure. In this respect, the finer the dendridic arm spacing, the finer the insoluble constituents found in the interstices, which, in turn, leads to more uniform finishability and better toughness in the resulting aluminum sheet; and, the resulting composite is well suited for additional hot working which is not always practical in the case of individual compacted particle sheets. Additionally, for some reason, the transverse ductility is also improved over that of individual compacted particle sheets; and, moreover, the resulting structure has a higher tensile strength and a higher yield point than a similar composite that might be fabricated from conventional sheet stock rather than compacted particle sheet. In this respect, it should be noted that increases in tensile and yield strengths are conventionally obtained by rolling ingots or the like to make them thinner. In the instant case, on the other hand, compacted particle sheets are first laminated to make a thicker composite and then reduced in thickness again to obtain the above-described desirable properties among others.

EXAMPLE I 105 sheets of 8 × 10 inch compacted particle sheet having guages of between 0.068 and 0.070 inch were comprised primarily of a 3105-type alloy. These sheets were degreased with perchloroethylene and, without wire brushing, tack-welded together to make 35 pieces of three laminae each. The 35 composite sheets were than heated in a 900°–950° F. furnace for 12–15 minutes and run through a hot-rolling mill set at 0.060 inches. The resulting composite laminae had guage thicknesses of between 0.104 and 0.109 inch (an average reduction of about 50%) and all such composites exhibited satisfactory bonding.

A 0.103 inch gauge sheet was mechanically tested and had an ultimate tensile strength (UTS) of 24.0 KSi, a yield strength (YS) of 17.3 KSi, an elongation of 18.5 percent (in 2 inches); an Olsen Cup Depth (OCD) of 0.486 inch; and, a Minimum Bend Radius (MBR) of 0.52 inch.

EXAMPLE II

Thirty of the composite sheets resulting from Example 1 were vapor degreased with perchloroethylene and, without wire brushing, tack-welded together in layers of three to form ten composite sheets of compacted particle sheet, each such composite being comprised of nine original layers. These "3—3—3" composites were then heated for 15 minutes in a 950° F. furnace and hot rolled through a mill having a setting of 0.120 inch to provide 0.160 inch thick "3—3—3" composites. One of the composites skewed to one side a bit, but all 10 composites were satisfactorily bonded.

A 0.155 gauge "3—3—3" sheet was mechanically tested and had a UTS of 22.4 KSi; a YS of 14.1 KSi; a 21.5 percent elongation; an OCD of 0.597 inch; and, an MBR of 0.81 inch.

EXAMPLE III

Several sheets of the "3—3—3" composite resulting from Example II were cut in half and, after degreasing with perchloroethylene, were tack-welded together to form a plurality of "9—9—9" composites comprised of 27 layers of the original compacted particle sheet. The "9—9—9" composites were then heated for 15 minutes at 950° F. and run through a hot rolling mill having a mill setting of 0.200 inches. These composites had a final gauge of 0.236 inches and all were adequately bonded.

A 0.236 gauge "9—9—9" sheet was mechanically tested and had a UTS of 22.1 KSi; a YS of 13.8 KSI; a 25.5 percent elongation; an OCD of 0.665 inch; and, an MBR of 0.78 inch.

EXAMPLE IV

One "1—1—1" composite from Example I having a gauge of 0.109 inch was heated for 5 minutes in a 950° F. furnace and passed through a hot rolling mill having a setting of 0.070 inches to produce a sheet of 0.095 inch gauge. This sheet was cut in half. One half was checked for properties in that condition. The other half was annealed for 15 minutes at 850° F. and cooled at 100° F. per hour before having its properties checked. The mechanical properties of the first such sheet were as follows:

A UTS of 21.4 KSi, a YS of 14.0 KSi; 17.3 percent elongation; an OCD of 0.473 inch; and an MBR of 0.33 inch.

The mechanical properties of the second sheet were as follows:

A UTS of 20.8 KSi, a YS of 13.0 KSi; 20.0 percent elongation; OCD of 0.451 inch; and, MBR of 0.33 inch.

EXAMPLE V

Six sheets of 0.070 × 8 × 10 inch compacted particle sheet were comprised primarily of a 3105-type alloy. These sheets were cleaned as above; spot welded; heated for 15 minutes at 950° F.; and, hot rolled at a mill setting of 0.160 inches to produce a six ply laminate having a gauge of 0.217 inch. One portion of the composite appeared to have an air occlusion, but the composite was otherwise satisfactorily bonded.

The composite had mechanical properties as follows: UTS 25.3 KSi; YS 18.0 KSi; 22.0 percent elongation; OCD of 0.604 inch; and, an MBR of 0.72 inch.

EXAMPLE VI

Six sheets of 0.070 × 8 × 10 inch compacted particle sheets were comprised primarily of a 3105-type alloy. These sheets were cleaned as above; tack welded; heated for 12 minutes at 950° F.; and, hot rolled through a mill set at 0.250 inches to produce a six ply composite having a gauge of 0.287 inch. The resulting composite, therefore, had about a 32 percent reduction and appeared to be satisfactorily bonded. The six-ply composite was then reheated for 15 minutes at 950° F.; cooled at room temperature; and, cold rolled to obtain an additional 20% gauge reduction. The resulting bond was satisfactory, but not as good as that resulting from the 32% reduction.

EXAMPLE VII

Four sheets of 0.070 inch compacted particle sheet comprised primarily of a 3105-type alloy were cleaned with methylethylketone and tack-welded together. The laminate was heated for 10 minutes at 950° F. and hot rolled through a mill set at 0.110 inch to provide a four-ply composite having a gauge of 0.146 inch and satisfactory bonding.

EXAMPLE VIII

Five sheets of 0.070 × 8 × 10 inch compacted particle sheets comprised primarily of 3105-type alloy were cleaned with methylethylketone and tack-welded together to form a five-ply laminate. The laminate was then heated for 12 minutes at 950° F. and hot rolled through a mill set at 0.140 inch to provide a five-ply composite having a gauge of 0.175 inch and satisfactory bonding.

EXAMPLE IX

Six sheets of 0.070 × 8 × 10 inch compacted particle sheet comprised primarily of a 3105-type alloy were cleaned with methylethylketone and tack-welded together to form a six-ply laminate. The laminate was heated for 15 minutes at 950° F. and hot rolled through a mill set at 0.170 inch to provide a six-ply composite laminate having a gauge of 0.209 inch and satisfactory bonding.

EXAMPLE X

Seven sheets of 0.070 × 8 × 10 inch compacted particle sheet comprised primarily of a 3105-type alloy were cleaned with methylethylketone and spot-welded to form a seven-ply laminate. The laminate was heated at 950° F. for 17 minutes and hot rolled through a mill set at 0.200 inch to form a seven-ply composite laminate having a gauge of 0.234 inch and satisfactory bonding.

EXAMPLE XI

Eight sheets of 0.070 × 8 × 10 inch compacted particle sheets comprised primarily of a 3105-type alloy were cleaned with methylethylketone and tack-welded together to form an eight-ply composite 0.560 inch thick. The composite was heated for 20 minutes at 950° F. and hot rolled through a mill set at 0.230 inch. The hot rolled composite had a gauge of 0.267 and generally adequate bonding, but air bubbles appeared on one side of the composite. EXAMPLE XII Nine sheets of 0.070 × 8 × 10 inch compacted particle sheet comprised primarily of a 3105-type alloy were cleaned with methylethylketone and tack-welded together to form a nine-ply composite 0.630 inch thick.

The composite was heated for 22 minutes at 950° F. and hot rolled through a mill set at 0.270 inch. The resulting composite had a gauge of 0.309 inch and was generally adequately bonded, but had even larger air bubbles on one side than in the composite of Example XI.

EXAMPLE XIII

After the second sheet of Example IV was tested for mechanical properties it was further cold rolled to obtain about a 20 percent reduction resulting in a 0.078 inch gauge. Its mechanical properties were UTS 23.2 KSi; YS 22.4 KSi; 6.5 percent elongation; an OCD of 0.433 inch; and, an MBR of 0.80 inch.

EXAMPLE XIV

After the composite of Example V was mechanically tested it was reheated at 950° F. for 5 minutes and hot rolled to obtain about an additional 20 percent reduction resulting in a 0.179 inch gauge. This further-reduced composite had mechanical properties of 25.3 KSi UTS; 18.3 KTi YS; a 21.0 percent elongation; an OCD of 0.551; and an MBR of 1.04 inch.

EXAMPLE XV

After the composite of Example XIV was mechanically tested it was annealed for 15 minutes at 840° F. and cooled at 100° F. per hour. Its mechanical properties were then found to be 23.0 KSi UTS; 14.3 KSI YS; a 23.8 percent elongation; an OCD of 0.615 inch; and an MBR of 1.04 inch.

EXAMPLE XVI

The composite resulting from Example XV was then cold rolled to obtain a reduction of about an additional 20 percent resulting in a gauge of 0.138 inch having a UTS of 27.2 KSi; YS of 25.7 KSi; a 9.5 percent elongation; an OCD of 0.450 inch; and, an MBR of 0.69 inch.

EXAMPLE XVII

After the composite of Example II was mechanically tested it was reheated for 5 minutes at 950° F. and then hot rolled to obtain about an additional 20 percent reduction to provide a 0.138 inch gauge having a UTS of 25.4 KSi; a YS of 19.3 KSi; an 18.0 percent elongation; an OCD of 0.512 inch; and, an MBR of 1.12 inch.

EXAMPLE XVIII

The composite resulting from Example XVII was then annealed for 15 minutes at 850° F. and cooled at 100° F. per hour. The thusly annealed composite had a UTS of 21.7 KSi; a YS of 12.8 KSi; a 23.8 percent elongation; an OCD of 0.592 inch; and, an MBR of 0.36 inch.

EXAMPLE IXX

The annealed composite of Example XVIII was then cold rolled about an additional 20 percent to obtain a 0.110 inch gauge having a UTS of 25.2 KSi; a YS of 23.2 KSi; an elongation of 8.5 percent; an OCD of 0.476 inch; and, an MBR of 0.56 inch.

EXAMPLE XX

After the composite of Example III was mechanically tested it was heated for 5 minutes in a 950° F. furnace and additionally hot rolled about 20 percent to result in a gauge of 0.191 inch having a UTS of 22.6 KSi; a YS of 15.9 KSi; a 21.5 percent elongation; an OCD of 0.664 inch; and, an MBR of 0.82 inch.

EXAMPLE XXI

After it was mechanically tested, the composite of Example XX was annealed for 15 minutes at 850° F. and cooled at 100° F. per hour. Its mechanical properties were then tested and found to have a UTS of 21.8 KSi; a YS of 14.2 KSi; a 24.0 percent elongation; an OCD of 0.650 inch; and, an MBR of 0.96 inch.

EXAMPLE XXII

The annealed composite of Example XXI was then cold rolled to obtain an additional reduction of about 20 precent to result in a gauge of 0.151 inch. This additionally cold-rolled composite had a UTS of 25.6 KSi; a YS of 23.2 KSi; a 10.5 percent elongation; an OCD of 0.556 inch; and, an MBR of 1.24.

EXAMPLE XXIII

A sheet of 8 × 10 inch compacted particle sheet having a 0.070 inch gauge was comprised primarily of a 3105-type alloy derived from scrap aluminum. This sheet was then cold rolled to a 0.017 inch gauge and used as a control sample to be compared with the sheets of Example XXIV. The thusly cold rolled sheet had a longitudinal UTS of 34.3 KSi; a transverse UTS of 36.1 KSi; a longitudinal YS of 31.8 KSi; a transverse YS of 31.9 KSi; a 3.0 percent longitudinal elongation; a 3.8 percent transverse elongation; an OCD of 0.230 inch; and an MBR of 2.38 inch.

EXAMPLE XXIV

Three, six, nine, and 27 ply composites were prepared in accordance with Examples I, V, II, and III above, respectively. Each was then cold-rolled to about a 0.015 inch gauge, found to have no delamination and tested for mechanical properties which were found to be in accordance with Table I, below.

TABLE I

| | GAGE IN. | UTS KSi | YS KSi | % ELONG (in 2″) | OCD IN. | MBR IN. |
|---|---|---|---|---|---|---|
| 3 Ply Longitudinal | 0.016 | 35.5 | 33.8 | 2.5 | 0.218 | 8.17 |
| 3 Ply Transverse | 0.016 | 36.6 | 34.1 | 2.0 | 0.218 | 8.17 |
| 6 Ply Longitudinal | 0.016 | 37.1 | 35.4 | 2.5 | 0.235 | 1.97 |
| 6 Ply Transverse | 0.016 | 36.2 | 35.2 | 2.0 | 0.235 | 1.97 |
| 9 Ply Longitudinal | 0.015 | 35.7 | 34.4 | 2.0 | 0.201 | 1.72 |
| 9 Ply Transverse | 0.014 | 36.4 | 33.7 | 2.0 | 0.201 | 1.72 |
| 27 Ply Longitudinal | 0.015 | 36.0 | 34.1 | 2.3 | 0.230 | 3.13 |
| 27 Ply Transverse | 0.016 | 35.5 | 33.5 | 2.0 | 0.230 | 3.13 |

In the above regard, many of the composites resulting from the above examples were also subjected to reverse-bend-bond tests. That is, samples of such composites were placed in a vice and flexed back and forth to see if it delaminated before it broke. In each of the examples I, II, III, and V, there was some delamination at fracture. In the Examples XIII through XXIV, however, there was not even any delamination at fracture. Where uses of laminated compacted particle sheet involve severe and repeated bending, therefore, it is advisable to reheat and further hot-reduce the composite prior to fabrication into a finished product.

EXAMPLE XXV

Three, six, and nine ply composites were prepared in accordance with Examples I, V, and II above, respectively. Upon completion, each was reheated for 15 minutes at 950° F.; hot rolled to a gauge of 0.070 inch and then cold rolled to a nominal gauge of 0.015 inch. None of the resulting sheets exhibited any delamination and test results for mechanical properties were as set forth in Table II, below.

TABLE II

|  | GAGE IN | UTS KSi | YS KSi | % ELON in 2" | OCD IN | MBR IN |
|---|---|---|---|---|---|---|
| 3 Ply Longitudinal | 0.016 | 37.8 | 35.7 | 2.0 | 0.198 | 5.72 |
| 3 Ply Transverse | 0.016 | 38.2 | 35.8 | 2.5 | 0.198 | 5.72 |
| 6 Ply Longitudinal | 0.017 | 36.2 | 34.4 | 2.0 | 0.229 | 1.15 |
| 6 Ply Transverse | 0.017 | 36.5 | 34.3 | 2.0 | 0.229 | 1.15 |
| 9 Ply Longitudinal | 0.017 | 37.1 | 35.1 | 2.0 | 0.205 | 1.87 |
| 9 Ply Transverse | 0.017 | 38.1 | 35.5 | 2.5 | 0.205 | 1.87 |

EXAMPLE XXVI

Three, six, and nine ply compacted particle sheets were formed in the same manner as set forth in Example XXV except that the sheets were annealed for ½ hour at 850° F. and cooled to room temperature prior to being mechanically tested. There was no visible delamination and the mechanical test results are set forth in Table III.

TABLE III

|  | GAGE IN | UTS KSi | YS KSi | % ELON in 2" | OCD IN |
|---|---|---|---|---|---|
| 3 Ply Longitudinal | 0.016 | 18.3 | 7.5 | 19.0 | 0.306 |
| 3 Ply Transverse | 0.017 | 17.6 | 7.8 | 14.5 | 0.306 |
| 6 Ply Longitudinal | 0.017 | 17.7 | 7.8 | 15.5 | 0.314 |
| 6 Ply Transverse | 0.017 | 17.6 | 7.3 | 16.0 | 0.314 |
| 9 Ply Longitudinal | 0.017 | 18.2 | 7.6 | 17.5 | 0.286 |
| 9 Ply Transverse | 0.016 | 18.1 | 7.9 | 13.3 | 0.286 |

EXAMPLE XXVII

Compacted particle sheets comprised primarily of 3105-type alloy were rolled into a billet after being suitably annealed at 850° F. and "slow cooled" at about 100° F. per hour. The thusly-coiled billets were then tack-welded and extruded as both solid bar and hollow tube. The solid bars gave longitudinal mechanical properties of 22–24 KSI, UTS; 10.6–11.5 KSi, YS; and 24–28 percent elongation in 2 inches. These properties show somewhat more ductility than unannealed laminated sheets of the same material.

The hollow tube had mechanical properties of 20.6 KSi UTS; 10.5 KSi YS; and, 38 percent elongation—indicating an even greater increase in ductility.

EXAMPLE XXVIII

A compacted particle sheet of 3105-type alloy made from essentially scrap aluminum was wound into a billet in the same manner as described in Example XXVII except that the compacted particle sheet was wound upon a core of 6061-type alloy and welded thereto. Thusly structured billets were then satisfactorily extruded into solid bars and hollow tubes in the same manner as set forth in Example XXVII.

As indicated the above-described composites can be made much thicker than conventional compacted particle sheets to permit their use in high-strength-requirement products such as sheet bumpers for automobiles which have heretofore not been fabricatable from compact particle sheets.

In the above regard, it has been found that compact particle sheet is not as sensitive to impurities as conventional sheets. Hence, compact particle sheets are particularly suited for use in recycling programs which have often been deterred by the high cost of removing unacceptable impurities from aluminum scrap. The above-described methods therefore are particularly suited for the production of high quality, thick, high-strength sheets made from recycled aluminous scrap. Often, however, it is desired to impart additional qualities, or predetermained properties to the resulting compacted particle sheets. For example, if the compacted particle sheet is not sufficiently corrosion-resistant, it may be desirable to make it so. Similarly, the compacted particle sheet might not be as receptive to polishing or chrome plating as one might like; or, it might be desired to improve the compacted particle sheet's properties so as to use it as a brazing sheet, for example.

It had been found that one method for improving certain properties of aluminous compacted particle sheet is to laminate it or clad it with sheets of other aluminous alloys. Examples of such lamination and cladding are as follows:

EXAMPLE XXIX

A sheet of 0.076 × 8 × 10 inch compacted particle sheet comprised of recycled aluminous scrap primarily composed of a 3105-type alloy was wire brushed and had a sheet of similarly wire brushed 12% silicon aluminum alloy tack welded to each side thereof. The 12% silicon aluminum alloy sheets were each 0.015 inch thick, making a total composite of 0.106 inch. The composite was heated for 15 minutes in a 950° F. furnace and hot rolled through a mill set at 0.035 inch. A satisfactory bond was formed and the bonded composite was then reheated for 5 minutes at 950° F. and rolled to obtain a guage of 0.068 inch. The bond was again satisfactory but the silicon layers showed slight blistering. The composite was again reheated to 950° and hot rolled through a mill set at 0.030 inch to give a resulting composite having a guage of 0.054 inch and good bonding. The brazing layer flowed nicely at a relatively low temperature of 1050° F. and the inclusion of oxides in the compacted particle sheet core strengthened the brazing sheet so that it had more than a normal amount of sag resistance.

If it is desired to laminate conventional alloy sheets it is necessary to wire brush the surface. In the case of compacted particle sheets, however, it has been found that wire brushing is not always necessary as indicated in the following example.

EXAMPLE XXX

A 0.078 inch compacted particle sheet of recycled aluminous scrap was composed primarily of a 3105-type alloy. One such sheet was laminated on one side with a sheet of 0.0065 inch 8079 corrosion-resistant alloy after the proposed contiguous surfaces were cleaned with methylethylketone. The sheets were then heated for 5 minutes at 950° F. and hot rolled through a mill set at 0.030 inch to result in a composite having a guage of 0.060 inch and a good bond. A second such compacted particle sheet of recycled aluminous scrap was clad on both sides with 0.065 sheets of 8079 corrosion resistant alloy and otherwise processed in the same manner as the first sheet. As with the first sheet, the doubly clad composite was satisfactorily bonded in order to provide a recycled-aluminous-scrap core having a corrosion-resistant surface.

The above described process of cladding with a corrosion resistant sheet is admirably suited for aluminum siding application. That is, the core can be fabricated from high-impurity aluminous scrap which otherwise has little utility, while satisfactory corrosion resistance is obtained by the thin layer(s) of corrosion resistant alloy. Similarly, compacted particle sheets comprised of recycled aluminous scrap are clad with one of the higher silicon alloys such as 3004 to provide a can stock having both increased brightness and reduced die-pick-up tendencies. Additionally, as will be described more fully shortly, thusly fabricated composites such as can stock can be further cold-rolled to improve their strength and result in a desired guage thickness.

EXAMPLE XXXI

A sheet of 0.070 × 8 × 10 inch compacted particle sheet of recycled aluminous scrap was cleaned with perchloroethylene and clad on both sides with sheets of 0.080 inch 2024 alloy after the alloy sheet had been wire brushed. The three sheets were then tack-welded and preheated for 10 minutes at 950° F. The composite was then hot-rolled in a mill set at 0.070 to result in a satisfactorily bonded composite having a gauge of 0.119 inch.

EXAMPLE XXXII

This was the same as Example XXXI except that the compact particle sheet was clad on both sides with 7075 alloy. The resulting structure was adequately bonded and had a gauge thickness of 0.119 inch.

EXAMPLE XXXIII

Using the same method steps and starting materials as in Example XXXI, a sheet of 2024 alloy was clad on both sides with compacted particle sheet composed of recycled aluminous scrap. The resulting composite was adequately bonded and had a gauge of 0.118 inch.

EXAMPLE XXXIV

Using the same starting materials and method as in Example XXXIII, a sheet of 7075 alloy was clad on both sides with compacted particle sheet composed of recycled aluminous scrap. The resulting structure was satisfactorily bonded and had a guage thickness of 0.120 inch.

The composites of Examples XXXI–XXXIV result in relatively low cost compacted particle sheets having higher strength properties than if they had been fabricated solely from compacted particle sheets.

As indicated above, it has been found that low cost compacted particle sheets can also be clad with other metals and even plastic in order to impart desired qualities to compacted particle sheet cores. Such composites are set forth in the following examples:

EXAMPLE XXXV

After heating and rolling, composites resulting from Examples I (three layers of compacted particle sheets), II ("3—3—3"), III ("9—9—9"), and V (six layers of compacted particle sheets) were covered with a layer of 0.007 inch copper which had been annealed for 5 minutes at 850° F. and then wire brushed. The resulting composites were then hot-rolled through mills set at 0.070, 0.105, 0.163, and 0.150 inch respectively, to result in well-bonded composites having respective gauges of 0.091, 0.133, 0.190, and 0.179 inch. In some cases, there were splits in the copper, but this was attributable to the thinness of the copper sheet—not to any lack of suitable bonding.

EXAMPLE XXXVI

Six sheets of 0.070 × 8 × 10 compacted particle sheets composed of recycled aluminous scrap were covered by a top layer of stainless steel mesh that had been suitably vapor degreased. The composite was then heated for 15 minutes at 950° F. and hot-rolled through a mill set at 0.170 inch to result in a well-bonded composite having a guage of 0.217 inch.

EXAMPLE XXXVII

A sample of the composite resulting from Example XXXVI was heated for 10 minutes at 950° F. and hot-rolled through a mill set at 0.120 inch. The resulting composite was well-bonded and had a guage thickness of 0.150 inch, but, as expected, some of the stainless steel strands were broken due to the severe size reduction and the thinness of the original strands.

EXAMPLE XXXVIII

A six-ply compacted particle sheet laminate such as set forth in Example V, was wire brushed and heated for 10 minutes at 950° F. A sheet of 0.017 inch 304 steel was then placed on top of the Example V-type laminate and the resulting composite was hot-rolled through a mill set at 0.120 inch. Although there was some slight edge cracking, the resulting composite was well bonded and had a guage of 0.155 inch.

The composites resulting from Examples XIX–XXII, can be reheated for a short period of time (5 minutes or so) at 900–950° F. to even further improve the integrity of the bonds. Excessive temperatures of over 1000° F. or, excessive times (more than about 15 minutes) however, tend to embrittle the aluminum-steel composites.

The above-described copper and steel clad embodiments are particularly useful in improving the chromium platability of the surfaces of the compacted particle sheet composed of recycled aluminous scrap. Additionally, the steel cladding—whether as described above or as an interior layer between compacted particle sheets—result in enhanced strength and elastic modulus of the resulting composites as compared with the same thickness of aluminum without such steel cladding.

Finally, it should be noted that the strength of above-described composites can be increased by further cold working. In the case of can stock examples, for instance, a composite having a 0.125 gauge after hot rolling can then be cold-rolled to about 0.014–0.017 thickness to obtain considerable strength increases.

Toughness is a very important quality for compacted particle sheet composites used in applications such as automotive bumpers. In this respect, toughness is a measure of the combined ductility and tensile strength of a metal. One method of measuring such toughness can be described in connection with FIG. 2 which is a graphic representation of stress per unit area v. strain. In connection therewith, standard ASTM rectangular tension samples are stressed to failure as indicated at Point 36 in FIG. 2; and, the maximum stress is represented by Point 38 therein. The toughness of a given sample is represented by the difference in the maximum load (at Point 36) per unit of the specimen's original cross-sectional area and the load at fracture (at point 38) per unit of original cross-sectional area. This difference is an indication of toughness and is particularly meaningful in relation to impact resistance of structures such as bumpers. The higher the differential between the two values, the more the material tends to stop running-cracks; and, the greater the material's ductility.

EXAMPLE XXXIX

Compacted particle sheets comprised primarily of a 7046-type alloy were laminated in the manner set forth in Example I and toughness-tested in the manner described above. Similarly, tension samples of standard 7046-type alloy were toughness-tested as described above. The standard 7046 sheet had yield strengths of between 55 KSi and 60 KSi while the compacted particle sheet samples had average yield strengths of 64 KSi. The differential-toughness of the standard 7046-type samples varied somewhat depending upon their tensile strength, but the differential-toughness for the high strength standard 7046-type samples averaged 4.1 KSI whereas the differential-toughness value of the 7046-type compacted particle sheet samples averaged about 4.9 KSI.

EXAMPLE XL

Compacted particle sheets of 7046-type alloy were laminated in accordance with Example I except that the surfaces of the individual sheets were wire brushed prior to lamination. All other tests were the same as in Example XXXIX above, but the average differential toughness of the thusly laminated sheets was increased to 5.5 KSI.

EXAMPLE XLI

Fifteen sheets of compacted particle sheet having gauges of 0.070 inch were comprised primarily of a 3105-type alloy produced from reclaimed aluminum scrap. These sheets were covered with 0.004 inch 15-7A precipitation hardened stainless steel sheets that had been suitably vapor degreased. The composites were then heated for 15 minutes at 950° F. and hot-rolled through a mill to obtain a well-bonded composite. These composites were then formed into an ashtray configuration which had a good appearance except for cigarette-holding recesses in the rim which showed wrinkling.

EXAMPLE XLII

A composite of the type resulting from Example V (six layers of compacted particle sheets) was clad on both sides with copper in the manner set forth in Example XLI. The bonding was good and the resulting composites were then successfully formed into ashtray shapes.

EXAMPLE XLIII

Compacted particle sheets comprised primarily of a 7046-type alloy were laminated in the manner set forth in Examples I, II, and III. Some of these composites were then clad with Type 304 stainless steel in the manner otherwise set forth in Example XLI; others were clad in the same manner with copper; and, still others were clad with a 6061-type alloy in the same manner. The thusly clad composites appeared to be well bonded.

EXAMPLE XLIV

Copper and stainless steel clad composites from Example XLIII were annealed for five minutes at 650°-675° F. and then successfully formed into ashtrays as set forth in Example XLII.

EXAMPLE XLV

Compacted particle sheets comprised primarily of 7046-type alloy produced rom reclaimed scrap aluminum were clad with type 304 stainless steel. The stainless steel was then buffed and chromium plated by a customary industrial plating process including a tin strike, a bronze strike, and bright-finish layers of copper, nickle, and then chromium. There was no delamination and the resulting finishes were satisfactory.

EXAMPLE XLVI

The same process as in Example XLV was followed except that the compacted particle sheet was clad with copper rather than stainless steel. The plating process and the results were otherwise substantially the same.

EXAMPLE XLVII

The method of Example XLV was followed except that the compacted particle sheet was not clad prior to plating. That is, it was bare-plated. In this example the final bright-chrome finish was acceptable, but had slight visual defects caused by the particles in the sheet.

EXAMPLE XLVIII 7046-type 0.070 inch gauge compacted particle sheets were clad with sheets of 6061-type alloy in the manner otherwise described in Example XLV. The thusly clad sheets were then cold worked to sheets having 11.1 percent, 8 percent, and 4.3 percent of original gauge. These were then plated in the manner otherwise described in Example XLV. The resulting bright-chrome finishes were acceptable, but had slight visual defects from particles in the original sheets.

EXAMPLES XLIX

Samples of the bright-plated sheets of Examples XLV-XLVIII were scribed and subjected to CASS corrosion-resistance tests (ASTM B-368). Some areas adjacent the scribed line showed undercutting or blistering; some samples had considerable undercoating, but otherwise had very little evidence of corrosion; and, other samples had no apparent undercutting. Only one of the samples (clad with 304 stainless steel) had any evidence of delamination, but this was believed to be due to an unascertained flow rather than a defect in the overall bonding process; and, only one sample (copper plate on six-ply composite) showed loss of chrome plate adhesion. This, however, was not the chrome-finish surface, itself rather than at one of the compacted particle sheet surfaces. On balance, therefore, the corrosion testing demonstrated high integrity of the bond surfaces between compacted particle sheets—the above noted defects indicating that some chrome-surface blistering and undercutting can be expected, depending upon the type and severity of use.

EXAMPLE L

Compacted particle sheets of 3004-type alloy obtained from primarily scrap aluminum were prepared as otherwise set forth in Examples I and VI to obtain three and six ply composites, respectively. Some of these sheets were clad on one side with an improved quality commercial can stock (MD-183); others were thusly clad on both sides; and the remainder were not clad. The resulting sheets were then cold-rolled to about 0.015 inch gauge; and, tested for mechanical properties as set forth in Table IV [the unclad composites being used as control sheets along with a 0.015 inch gauge reference sheet of the improved can stock (MD 183)].

The three and six ply composites of Example L that were clad on one and both sides were then used as stock material to fabricate conventional beverage cans in conventional draw-and-iron can machines. The canstocks of this example were adequately fabricated into cans, but the surface quality of the cans was not as good as desired because the yield strengths were higher than those for typical can stocks and the elongations were a bit lower than typical. In this respect, as shown in Table IV, the maximum "earing" for any of the drawn-and-ironed can samples was 9.6 and the maximum number of ears was four. This maximum earing percentage is greater than the usually-desired 6 percent upper-limit, but there was no apparent delamination, thereby indicating that composite compacted particle sheet in accordance with the invention can in fact be satisfactorily formed into beverage cans even though the composites are mostly fabricated from reclaimed aluminum scrap.

TABLE IV

| | GAGE IN | UTS KSi | YS KSi | % ELON in 2" | EAR- ING | # EARS |
|---|---|---|---|---|---|---|
| 3 Ply Control Sheet (bare) | 0.015 | 43.5 | 42.6 | 2.0 | 5.3 | 4 |
| One side clad | 0.015 | 43.0 | 42.0 | 2.0 | 5.3 | 4 |
| Two sides clad | 0.015 | 45.6 | 43.8 | 2.3 | 7.6 | 4 |
| 6 Ply Control Sheet (bare) | 0.015 | 42.0 | 40.7 | 1.5 | 2.4 | 4 |
| One side clad | 0.015 | 45.7 | 44.1 | 3.3 | 9.6 | 4 |
| Two Sides Clad | 0.015 | 42.9 | 44.4 | 2.0 | 5.5 | 4 |

TABLE IV-continued

| | GAGE IN | UTS KSi | YS KSi | % ELON in 2" | EAR- ING | # EARS |
|---|---|---|---|---|---|---|
| Reference Sheet of Improved Can Stock (MD183) | 0.015 | 41.5 | 37.7 | 4.2 | 2.9% | — |

While the invention has been particularly shown and described with reference to preferred embodiments, it will be understood that various changes in form and detail may be made therein without departing from the spirit and scope of the invention. For example, while specific alloys have been described in the examples, other alloys can also be used to obtain similar and additional results.

The embodiments of the invention in which an exclusive property or privilege are claimed are defined as follows:

1. A method of producing laminated compacted-particle aluminum sheets including the steps of:
   providing a plurality of compacted-particle aluminum sheets and forming said plurality of sheets into a plurality of laminates;
   preheating each of said laminates of compacted-particle aluminum sheets;
   rolling each of said laminates in a hot rolling mill to bond said sheets together and form bonded composite laminates;
   cleaning each of said composite laminates;
   fastening said cleaned composite laminates together;
   further preheating the thusly fastened composite laminates; and
   hot rolling the thusly fastened composite laminates to heat bond them together.

2. The method as in claim 1 including the step of annealing the resulting heat-bonded composite laminate; and
   cooling said resulting laminate at a controlled rate.

* * * * *